(12) United States Patent
Valesh (10) Patent No.: US 9,028,360 B2
(45) Date of Patent: May 12, 2015

(54) MULTI RATIO DRIVE (71) Applicant: Michael L. Valesh, Villa Park, IL (US)

(72) Inventor: Michael L. Valesh, Villa Park, IL (US)

( * ) Notice: Subject to any disclaimer, the term of this patent is extended or adjusted under 35 U.S.C. 154(b) by 0 days.

(21) Appl. No.: 14/320,031

(22) Filed: Jun. 30, 2014

(65) Prior Publication Data
US 2014/0309070 A1   Oct. 16, 2014

Related U.S. Application Data (63) Continuation of application No. 14/015,400, filed on Aug. 30, 2013, now Pat. No. 8,764,600, which is a continuation of application No. 12/687,724, filed on Jan. 14, 2010, now Pat. No. 8,523,727.

(51) Int. Cl.
F16H 3/44 (2006.01)
B60K 25/06 (2006.01)
F16H 3/089 (2006.01)
F16H 3/66 (2006.01)
F16H 37/08 (2006.01)
F16H 48/08 (2006.01)
F16H 57/037 (2012.01)

(52) U.S. Cl.
CPC ............... *B60K 25/06* (2013.01); *F16H 3/089* (2013.01); *F16H 3/66* (2013.01); *F16H 48/08* (2013.01); *F16H 57/037* (2013.01); *F16H 2200/0004* (2013.01); *F16H 2200/0008* (2013.01); *F16H 37/08* (2013.01)

(58) Field of Classification Search
None
See application file for complete search history.

(56) References Cited

U.S. PATENT DOCUMENTS

| | | | | |
|---|---|---|---|---|
| 1,490,644 A * | 4/1924 | Sturmey et al. | | 475/281 |
| 1,530,205 A * | 3/1925 | Ruckstell | | 475/204 |
| 1,706,551 A * | 3/1929 | Starr | | 475/204 |
| 2,011,401 A * | 8/1935 | Fawick | | 475/287 |
| 2,183,667 A * | 12/1939 | Buckendale | | 475/203 |
| 2,464,538 A * | 3/1949 | Vanderzee | | 192/48.613 |
| 2,831,372 A * | 4/1958 | Boughner | | 475/203 |
| 3,352,175 A * | 11/1967 | Bergles | | 475/297 |
| 3,536,171 A * | 10/1970 | Bergles | | 192/217.4 |
| 3,886,811 A * | 6/1975 | Hillyer | | 475/297 |
| 5,385,513 A * | 1/1995 | Ishii et al. | | 475/203 |
| 2010/0267508 A1 * | 10/2010 | Hvolka et al. | | 475/149 |

* cited by examiner

*Primary Examiner* — Justin Holmes
(74) *Attorney, Agent, or Firm* — Cardinal Law Group (57) ABSTRACT A multi ratio drive including a first drive chain having a first drive chain engaged state and a first drive chain disengaged state; and a second drive chain having a second drive chain engaged state and a second drive chain disengaged state. The first drive chain drives the axle with a first gear ratio between the drive shaft and the axle when the first drive chain is in the first drive chain engaged state and the second drive chain is in the second drive chain disengaged state; the second drive chain drives the axle with a second gear ratio between the drive shaft and the axle when the second drive chain is in the second drive chain engaged state and the first drive chain is in the first drive chain disengaged state; and the first gear ratio is different from the second gear ratio.

12 Claims, 9 Drawing Sheets

MULTI RATIO DRIVE

CROSS-REFERENCE TO RELATED APPLICATIONS

This application is a continuation of, and claims the benefit of, U.S. patent application Ser. No. 14/015,400 filed Aug. 30, 2013, which is a continuation of, and claims the benefit of, U.S. patent application Ser. No. 12/687,724 filed Jan. 14, 2010, (now U.S. Pat. No. 8,523,727), the entire disclosures of each which are incorporated herein by reference.

TECHINICAL FIELD

The field of this disclosure is drives for power transfer in vehicles, particularly, a multi ratio drive.

BACKGROUND

This invention is the idea of a mechanic with forty years in the field. The purpose of the invention is to increase the efficiency of the final drive unit in a vehicle by increasing performance and thereby using less energy. Vehicles, such as cars, pickup trucks, load hauling semi tractors, and the like, typically have an engine that generates power, a transmission that provides speed-torque conversion for that power, and a drive that provides the converted power to the axle and wheels. The combination of the transmission, drive, and axle is known as the drive train.

In rear wheel drive vehicles, power passes from the engine to the transmission, through the transmission to a drive shaft, and through the drive shaft to a single ratio drive. The transmission changes the rotation rate between the engine and the drive shaft. The single ratio drive includes a pinion gear in contact with a ring gear, which changes the plane of rotation from the drive shaft to the axles. A differential attached to the ring gear allows the axles to turn independently of each other and to turn the drive wheels.

In front wheel drive vehicles and rear engine, rear drive vehicles, the engine is mounted transversely (side to side) in the vehicle and the engine crankshaft turns in the same plane as the drive wheels. A transaxle houses the transmission and the drive assembly in a single transaxle case. Larger front wheel drive vehicles use a drive planetary gear set, which has a single ratio sun gear driven by the transmission output shaft, and a drive assembly that has the planet assembly and differential assembly built together as one assembly. The single ratio sun gear drives several single ratio planet gears in contact with a single ratio ring gear lugged to the transaxle case that the drive assembly walks around. Because the ring gear is lugged to the transaxle case and does not turn, the differential assembly attached to the drive assembly turns, turning the axles and the wheels. smaller front wheel drive vehicles use an idler gear driven by the transmission output shaft to drive a pinion gear, which drives a ring gear positively attached to the differential assembly Unfortunately, changes in the gear ratio between the engine and the wheels in the drive train of both rear wheel and front wheel drive vehicles are limited to the transmission: the drive is limited to a single gear ratio. A high gear ratio, such as four-to-one, is desirable for quick starts with high torque to get the vehicle moving, but is undesirable for high speed operation. A low gear ratio, such as one-to-one, is desirable for high speed operation, but is undesirable or unable to start vehicle motion. Typically, a compromise gear ratio of three-to-one is selected, but this is only efficient at mid range speeds. The compromise gear ratio wastes energy because the gear ratio is not matched to the operating speed. In addition, the gear ratio limits the ability to attain maximum acceleration. Although the gear ratio can be changed by disassembling the drive and changing out the gears, the gear ratio cannot be changed in operation.

It would be desirable to have a multi ratio drive that would overcome the above disadvantages.

SUMMARY OF THE INVENTION

One aspect of the present invention provides a multi ratio drive operably connecting a drive shaft and an axle, the multi ratio drive including a first drive chain having a first drive chain engaged state and a first drive chain disengaged state; and a second drive chain having a second drive chain engaged state and a second drive chain disengaged state. The first drive chain drives the axle with a first gear ratio between the drive shaft and the axle when the first drive chain is in the first drive chain engaged state and the second drive chain is in the second drive chain disengaged state; and the second drive chain drives the axle with a second gear ratio between the drive shaft and the axle when the second drive chain is in the second drive chain engaged state and the first drive chain is in the first drive chain disengaged state. The first gear ratio is different from the second gear ratio.

Another aspect of the present invention provides a multi ratio drive operably connected to a drive shaft, the multi ratio drive including a pinion gear rotatable by the drive shaft; a main shaft; a fixed ring gear fixed to the main shaft and engaged with the pinion gear; a differential shaft; a first drive chain having a first main shaft ring gear lockable to the main shaft and a first differential shaft ring gear fixed to the differential shaft and engaged with the first main shaft ring gear, the first drive chain having a first gear ratio; a second drive chain having a second main shaft ring gear lockable to the main shaft and a second differential shaft ring gear fixed to the differential shaft and engaged with the second main shaft ring gear, the second drive chain having a second gear ratio; a differential operably connected to the differential shaft; a first axle operably connected to the differential; and a second axle operably connected to the differential. The first drive chain operably connects the drive shaft to the first axle and the second axle at a first gear ratio when the first main shaft ring gear is locked to the main shaft and the second main shaft ring gear is not locked to the main shaft; and the second drive chain operably connects the drive shaft to the first axle and the second axle at a second gear ratio when the second main shaft ring gear is locked to the main shaft and the first main shaft ring gear is not locked to the main shaft.

Yet another aspect of the present invention provides multi ratio drive including a housing; a piston longitudinally slideable in the housing; a ring gear shell longitudinally slideable and rotatably fixed in the housing, the ring gear shell being coupled to the piston and having a first ring gear and a second ring gear; a sun gear shaft having a first sun gear and a second sun gear; a planet gear assembly having a first planet gear operably connected to a planet carrier and a second planet gear operably connected to the planet carrier; a differential operably connected to the planet carrier; a first axle operably connected to the differential; and a second axle operably connected to the differential. A first drive chain comprises the first sun gear, the first planet gear, and the first ring gear, the first planet gear being engaged with the first sun gear and the first ring gear being engagable with the first planet gear; a second drive chain comprises the second sun gear, the second planet gear, and the second ring gear, the second planet gear being engaged with the second sun gear and the second ring gear being engagable with the second planet gear; the first drive chain connects the sun gear shaft to the first axle and the second axle at a first gear ratio when the piston positions the ring gear shell with the first ring gear being engaged with the first planet gear; and the second drive chain connects the sun gear shaft to the to the first axle and the second axle at a second gear ratio when the piston positions the ring gear shell with the second ring gear being engaged with the second planet gear.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION

Figure 1:
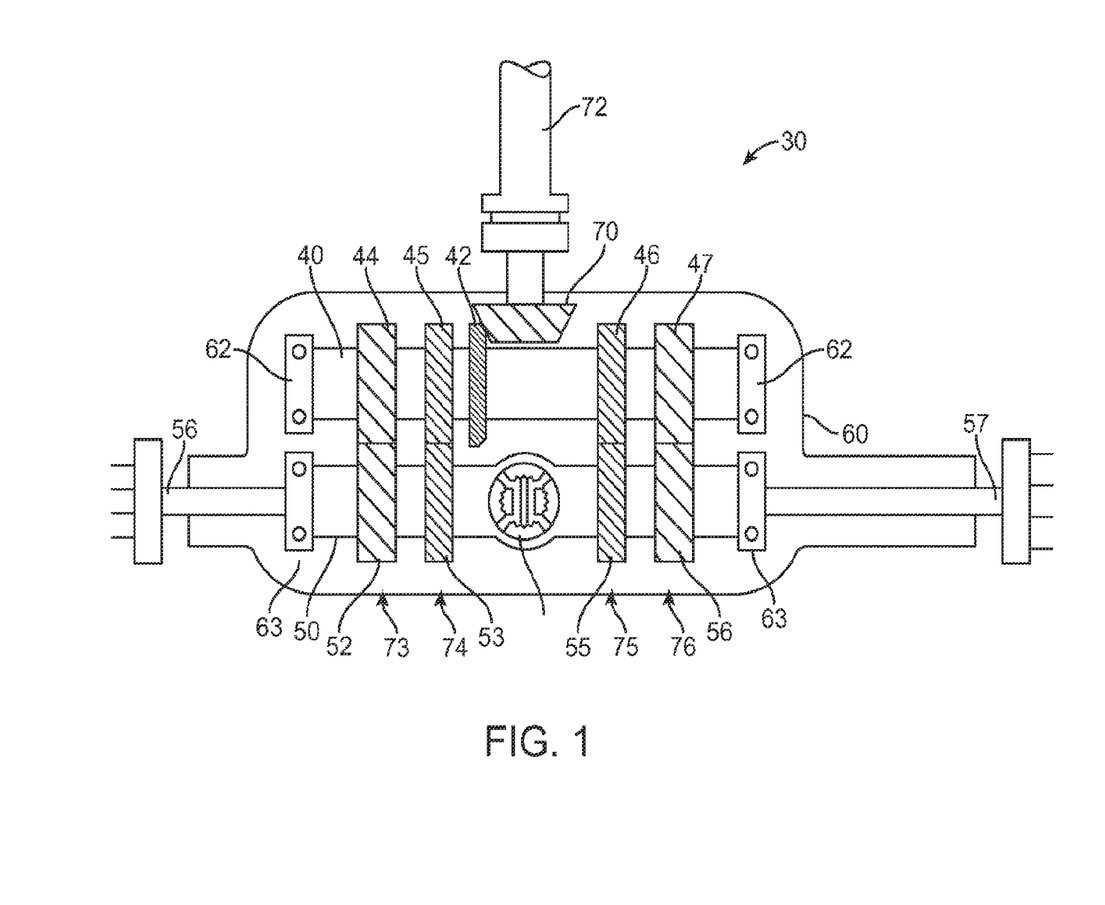
FIG. 1 is a schematic diagram of a multi ratio drive in accordance with the present invention.

FIG. 1 is a schematic diagram of a multi ratio drive in accordance with the present invention. The multi ratio drive operably connects a drive shaft and an axle to provide a number of gear ratios between the drive shaft and axle. The multi ratio drive includes a first drive chain having a first drive chain engaged state and a first drive chain disengaged state, and at least a second drive chain having a second drive chain engaged state and a second drive chain disengaged state. The first drive chain drives the axle with a first gear ratio between the drive shaft and the axle when the first drive chain is in the first drive chain engaged state and the second drive chain is in the second drive chain disengaged state. The second drive chain drives the axle with a second gear ratio between the drive shaft and the axle when the second drive chain is in the second drive chain engaged state and the first drive chain is in the first drive chain disengaged state. The first gear ratio is different from the second gear ratio.

In the embodiment of FIG. 1, the first drive chain includes a first main shaft ring gear engaged with a first differential shaft ring gear, the first main shaft ring gear being locked on a main shaft when the first drive chain is in the first drive chain engaged state and being rotatable on the main shaft when the first drive chain is in the first drive chain disengaged state, and the first differential shaft ring gear being fixed on a differential shaft. The second drive chain includes a second main shaft ring gear engaged with a second differential shaft ring gear, the second main shaft ring gear being locked on the main shaft when the second drive chain is in the second drive chain engaged state and being rotatable on the main shaft when the second drive chain is in the second drive chain disengaged state, and the second differential shaft ring gear being fixed on the differential shaft. The multi ratio drive can be used for rear wheel drive vehicles or the like, with the drive shaft delivering power from the engine and the axle being a straight axle or a pair of axles connected to the drive chains through a differential.

The multi ratio drive 30 includes a main shaft 40 rotatably supported in a housing 60 by bearings 62 and a differential shaft 50 rotatably supported in the housing 60 by bearings 63. The housing 60 can contain lubricant (not shown) for the components of the multi ratio drive 30 within the housing 60, with seals (not shown) where any components pass through the housing 60. A pinion gear 70 receives rotational power from a drive shaft 72 and transfers the power to a fixed ring gear 42 fixed to the main shaft 40, rotating the main shaft 40 about its longitudinal axis. The main shaft 40 also has two or more main shaft ring gears 44, 45, 46, 47, each of which has a locked state and a rotatable state. In the locked state, the main shaft ring gear is locked to and rotates with the main shaft 40. In the rotatable state, the main shaft ring gear is free from and rotates about the main shaft 40. Those skilled in the art will appreciate that the main shaft ring gears 44, 45, 46, 47 can be switched between the locked and rotatable states using slip clutches, which are responsive to rotational speed (rpm) of the main shaft 40 or centrifugal force to engage and disengage the main shaft ring gears 44, 45, 46, 47 with the main shaft 40. The slip clutch locks the main shaft ring gear on the main shaft when the associated drive chain is in the drive chain engaged state. Slip clutches as defined herein are clutches which are operable to selectively engage or disengage gears to a shaft in response to a desired condition, such as desired rotational speed, desired centrifugal force, or the like. In one embodiment, the slip clutch can selectively engage or disengage the gears to the shaft regardless of the direction of shaft rotation.

The main shaft ring gears 44, 45, 46, 47 each mesh with one of the differential shaft ring gears 52, 53, 55, 56, which are fixed to and rotate with the differential shaft 50. The differential shaft ring gears 52, 53, 55, 56 and main shaft ring gears 44, 45, 46, 47 form drive chains 73, 74, 75, 76. The drive chains 73, 74, 75, 76 can have different gear ratios (from tooth spacing, diameter, and the like) to allow the multi ratio drive 30 to operate at different gear ratios between the drive shaft 72 and axles 56, 57. In one embodiment, the differential shaft 50 includes a differential 54 operably connected to the axles 56, 57 to allow differential slip between the two axles 56, 57. In another embodiment, the differential is omitted and the axle is a solid axle transferring power directly from the differential shaft ring gears 52, 53, 55, 56 to the load, such as vehicle wheels or a stationary machine (e.g., a generator, water pump, hydraulic pump, or the like).

In operation, the drive shaft 72 rotates the pinion gear 70, causing the main shaft 40 to rotate through the pinion gear 70. When one of the main shaft ring gears 44, 45, 46, 47 is in the locked state, the locked main shaft ring gear rotates with the main shaft 40 and drives the differential shaft ring gear associated with the locked main shaft ring gear in the drive chain. The differential shaft ring gear rotates the differential shaft 50, which rotates the axles 56, 57 through the differential 54. The other main shaft ring gears in the rotatable state, i.e., not in the locked state, rotate about the main shaft 40, driven by the differential shaft ring gear associated with the rotatable main shaft ring gears in the drive chains, but transfer minimal power. The gear ratio of the multi ratio drive 30 can be changed by unlocking the presently locked main shaft ring gear and engaging one of the presently rotatable main shaft ring gears. Those skilled in the art will appreciate that a number of possible gear ratios can be provided, limited only by the space available in the housing 60 for the sets of drive chains 73, 74, 75, 76. Exemplary uses of the multi ratio drive are rear wheel drive cars, pickup trucks, load hauling semi tractors, and the like.

Figure 2:
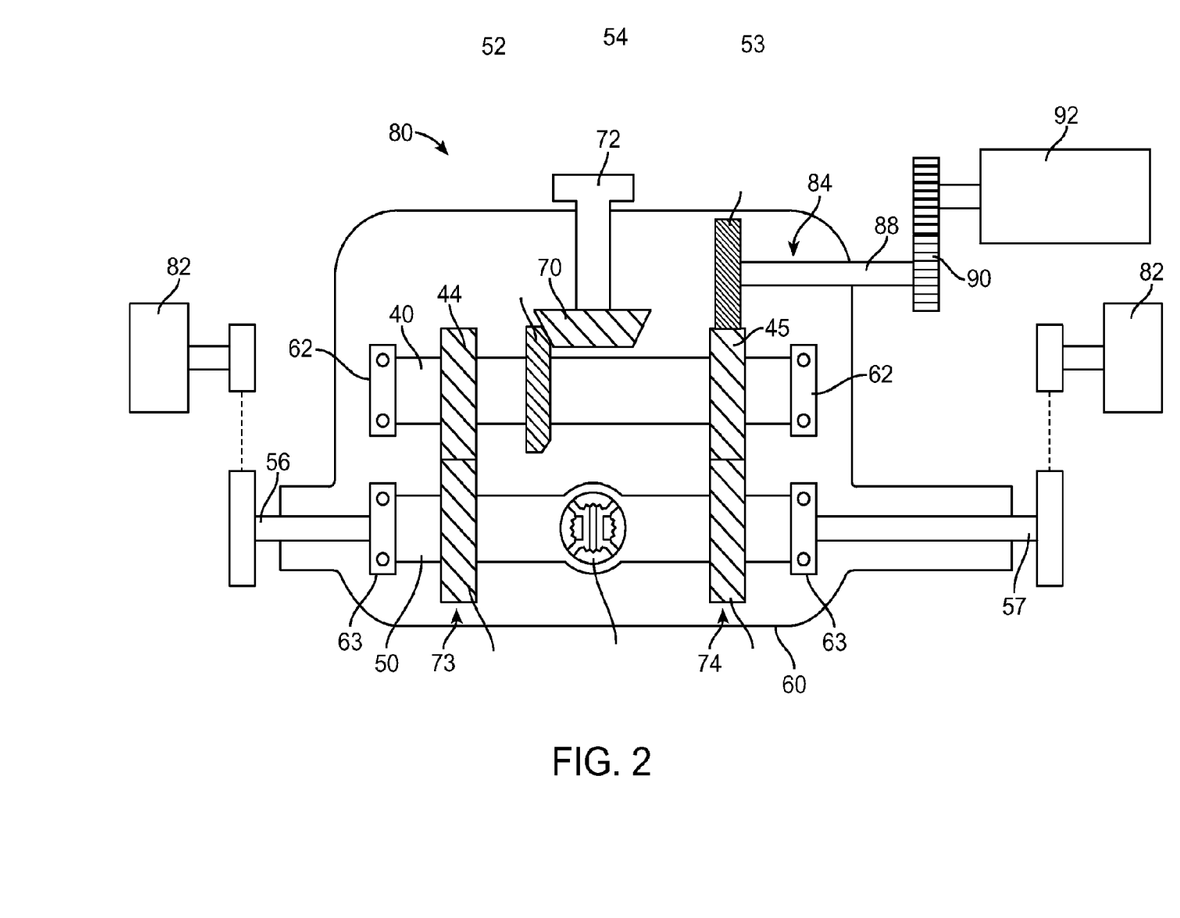
FIG. 2 is a schematic diagram of another embodiment of a multi ratio drive in accordance with the present invention.

FIG. 2, in which like elements share like reference numbers with FIG. 1, is a schematic diagram of another embodiment of a multi ratio drive in accordance with the present invention. In this embodiment, the multi ratio drive can drive an external load or stationary machine, such as a generator, water pump, hydraulic pump, or the like. The axles 56, 57 of the multi ratio drive 80 can be coupled through gears, a chain, or the like to drive one or more stationary machines 82. In one embodiment, the differential 54 is omitted and the axle 56 is a solid axle transferring power directly from the differential shaft ring gears 52, 53 to the load.

The multi ratio drive 80 can also include a power take-off (PTO) 84 coupled to one of the main shaft ring gears 44, 45. In this example, the power take-off 84 includes a PTO coupling gear 86 engaged with the drive chain 74 through one of the main shaft ring gears 45, a PTO shaft 88, and a PTO driving gear 90 coupled to an external load 92. The main shaft ring gear 45 has a locked and a rotatable state, so the power take-off 84 can be engaged or disengaged from the load 92 by engaging or disengaging the main shaft ring gear 45 from the main shaft 40.

Figure 3A:
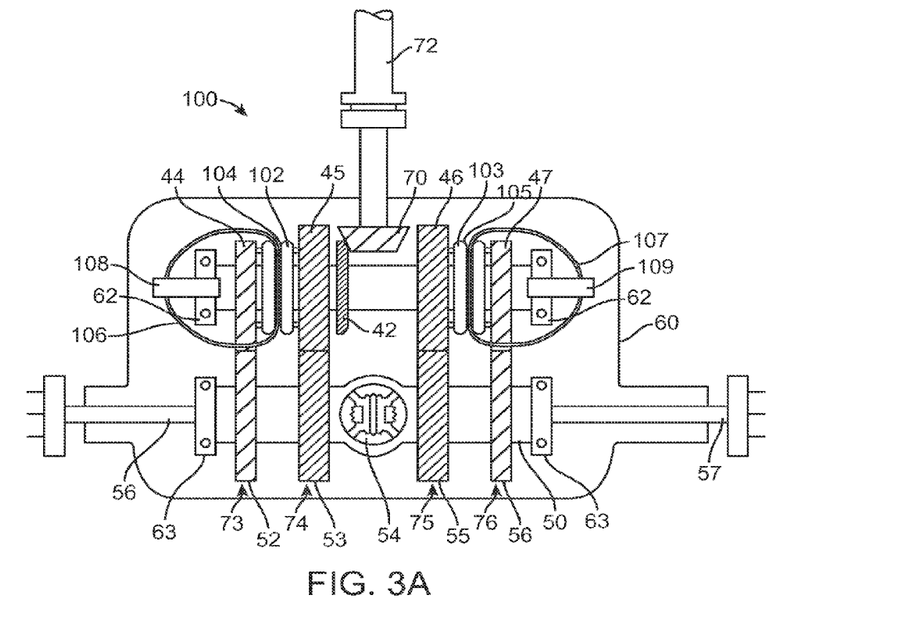
FIG. 3A is a schematic diagram of another embodiment of a multi ratio drive in accordance with the present invention.

FIG. 3A, in which like elements share like reference numbers with FIG. 1, is a schematic diagram of another embodiment of a multi ratio drive in accordance with the present invention. In this embodiment, the main shaft ring gears are engaged and disengaged from the main shaft using a synchronizer. The synchronizer can be disposed on the main shaft between the first main shaft ring gear and the second main shaft ring gear and be slideable on the main shaft to engage one of the first main shaft ring gear and the second main shaft ring gear. The synchronizer locks the first main shaft ring gear to the main shaft when the first drive chain is in the first drive chain engaged state, and locks the second main shaft ring gear to the main shaft when the second drive chain is in the second drive chain engaged state.

The main shaft ring gears 44, 45, 46, 47 in this embodiment of the multi ratio drive 100 rotate freely about the main shaft 40. A synchronizer 102, 103 is adjacent to one or two of the main shaft ring gears 44, 45, 46, 47 and is operable to slide along the longitudinal axis of the main shaft 40. The synchronizer 102, 103 can be switched between neutral and locked states by sliding the synchronizer 102, 103 along the main shaft 40. In the neutral state, the synchronizer 102, 103 is free to rotate about the main shaft 40. In the locked state, the synchronizer 102, 103 is locked to and rotates with the main shaft 40. The synchronizer 102, 103 in the locked state engages one of the main shaft ring gears 44, 45, 46, 47, so the engaged main shaft ring gear is in a locked state and rotates with both the synchronizer 102, 103 and the main shaft 40. The synchronizer 102, 103 and the main shaft ring gears 44, 45, 46, 47 have complementary mateable portions so that the synchronizer 102, 103 and the engaged main shaft ring gear turn together when the synchronizer 102, 103 is pushed toward the main shaft ring gear. Thus, power passes from the main shaft 40, through the synchronizer 102, 103, the main shaft ring gear, and the differential shaft ring gear in the drive chain to the differential shaft 50.

Figure 3B:
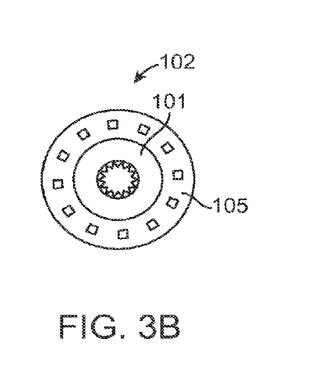
FIG. 3B is a detailed side view of a synchronizer for use in a multi ratio drive in accordance with the present invention.

FIG. 3B, in which like elements share like reference numbers with FIG. 3A, is a detailed side view of a synchronizer for use in a multi ratio drive in accordance with the present invention. The synchronizer 102 can have an inner hub 101 positively splined to and turned by the main shaft and an outer sleeve 105 that can slide along the inner hub 101 relative to the longitudinal axis of the main shaft. The outer sleeve 105 slides longitudinally to engage the adjacent main shaft ring gear with complementary mateable portions, such as gears, dog teeth gears, or the like. The synchronizer 103 can be similar to or the same as the synchronizer 102.

Referring to FIG. 3A, when one synchronizer, such as synchronizer 102, is used with two main shaft ring gears 44, 45, the synchronizer 102 is located between the two main shaft ring gears 44, 45 with the neutral state centered between the two main shaft ring gears 44, 45. The synchronizer 102 can be moved one direction along the main shaft 40 to enter the locked state and engage one of the two main shaft ring gears 44, 45 and the other direction along the main shaft 40 to enter the locked state and engage the other of the two main shaft ring gears 44, 45. The synchronizer 103 can be used in the same manner as the synchronizer 102, only with the two main shaft ring gears 46, 47. When the synchronizer is used with a single main shaft ring gear, the synchronizer is located adjacent the main shaft ring gear with the neutral state away from the single main shaft ring gear. The synchronizer can be moved along the main shaft toward the single main shaft ring gear to enter the locked state and engage the single main shaft ring gear.

The synchronizer 102, 103 can be moved longitudinally with a shift fork 106, 107 riding in a groove 104, 105 in the outer surface of the synchronizer 102, 103. The shift fork 106, 107 can be moved relative to the housing 60 by an actuator 108, 109 such as a solenoid, actuator, vacuum motor, hydraulic motor, or the like. In one embodiment, the actuator 108, 109 is responsive to an actuator command signal from a vehicle computer. The shift fork 106, 107 can also be instrumented with position sensors providing shift fork position and movement indication to the vehicle computer. In another embodiment, the synchronizer 102, 103 can be moved longitudinally with levers, cables, or the like, as used to change gears in vehicles with manual transmissions.

Those skilled in the art will appreciate that in another embodiment the synchronizers and shift forks can be omitted and the main shaft ring gears moved with a hydraulic clutch pack, such as a hydraulic clutch pack employing hydraulic cylinders as used in automatic transmissions. In one embodiment, the same pump that provides pressure to the automatic transmission can drive the hydraulic clutch pack, and the vehicle computer can also control the hydraulic clutch pack. The hydraulic clutch pack can be operable to engage one of the first main shaft ring gear and the second main shaft ring gear, locking the first main shaft ring gear to the main shaft when the first drive chain is in the first drive chain engaged state and locking the second main shaft ring gear to the main shaft when the second drive chain is in the second drive chain engaged state.

Figure 4A:
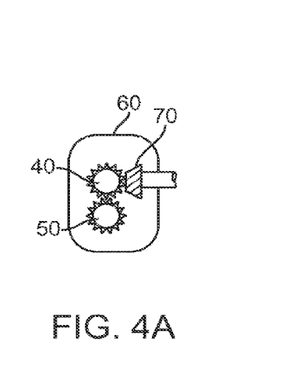
FIGS. 4A and 4B are cutaway side views of multi ratio drives in accordance with the present invention.
Figure 4B:
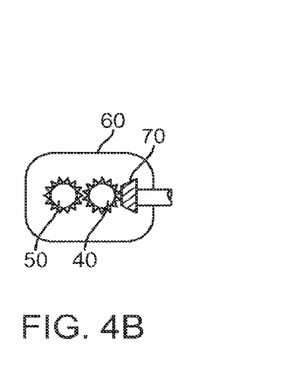

FIGS. 4A and 4B, in which like elements share like reference numbers with FIG. 1, are cutaway side views of multi ratio drives in accordance with the present invention. Referring to FIG. 4A, the main shaft 40 is mounted above the differential shaft 50 in the housing 60. Referring to FIG. 4B, the main shaft 40 is mounted behind the differential shaft 50 in the housing 60. Those skilled in the art will appreciate that the relative positions of the main shaft 40 and the differential shaft 50 can be selected as desired for a particular application.

Figure 5:
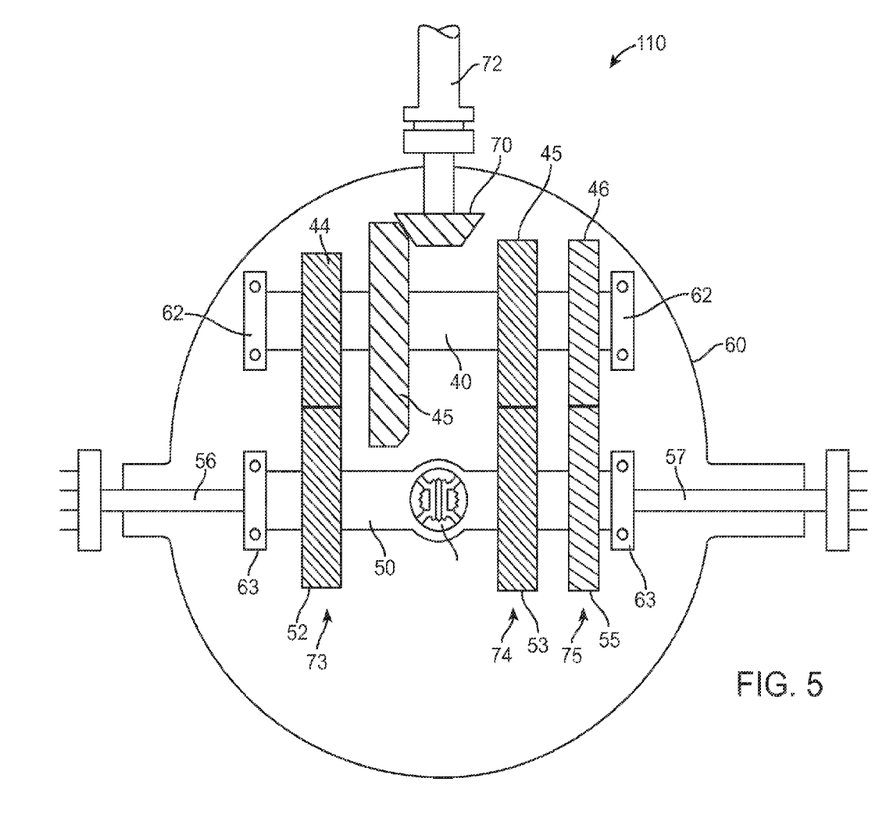
FIG. 5 is a schematic diagram of another embodiment of a multi ratio drive in accordance with the present invention.

FIG. 5, in which like elements share like reference numbers with FIG. 1, is a schematic diagram of another embodiment of a multi ratio drive in accordance with the present invention. In this example, the multi ratio drive 110 is the embodiment described for FIG. 1 above, with the components scaled to approximate their actual relative dimensions. The main shaft ring gears 44, 45, 46 can be switched between the engaged and disengaged states using slip clutches, which are responsive to rotational speed (rpm) of the main shaft 40 or centrifugal force to engage and disengage the main shaft ring gears 44, 45, 46 with the main shaft 40. Each of the drive chains 73, 74, 75 can have different gear ratios (from tooth spacing, diameter, and the like) to allow the multi ratio drive 110 to operate at different gear ratios between the drive shaft 72 and axles 56, 57. Each of the drive chains 73, 74, 75 can also have different thicknesses to meet torque requirements. For drive chains 73, 74, 75 with a higher gear ratio used to start vehicle motion and at lower vehicle speeds, the drive chain can be thicker to meet the high torque demand. For drive chains 73, 74, 75, 76 with a lower gear ratio used when the vehicle is in motion, the drive chain can be thinner since the torque demand is less. The components of the multi ratio drive 110 can be sized to fit within a conventional housing 60 currently in use for vehicles, so the multi ratio drive 110 can be retrofit to vehicles currently in use.

Figure 6:
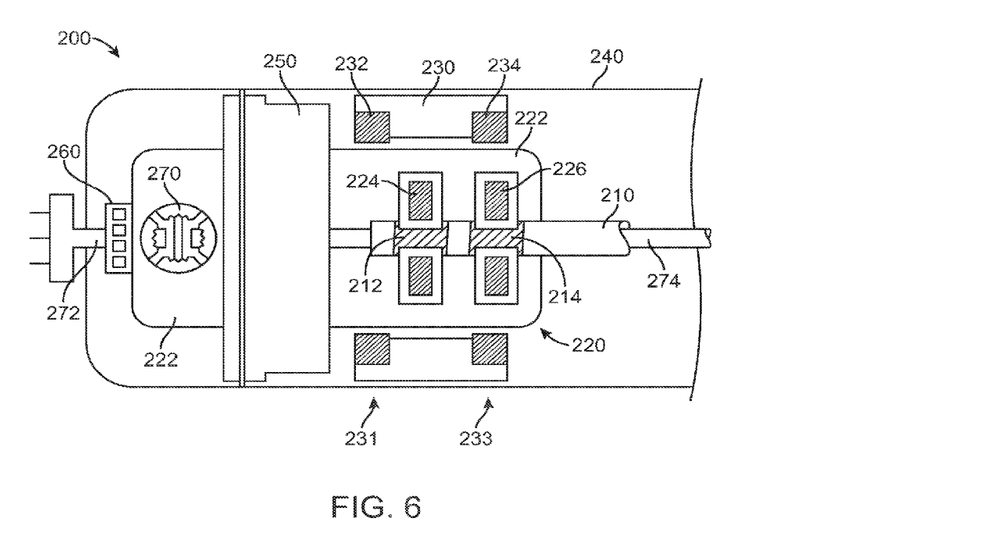
FIG. 6 is a schematic diagram of another embodiment of a multi ratio drive in accordance with the present invention.

FIG. 6 is a schematic diagram of another embodiment of a multi ratio drive in accordance with the present invention. In this embodiment, the multi ratio drive includes a housing; a piston longitudinally slideable in the housing; and a ring gear shell longitudinally slideable and rotatably fixed in the housing. The ring gear shell is coupled to the piston. The first drive chain includes a first sun gear, a first planet gear, and a first ring gear. The first sun gear is disposed on a sun gear shaft. The first planet gear is engaged with the first sun gear, is rotatable about the sun gear shaft, and is operably connected to rotate a planet carrier about the sun gear shaft. The first ring gear is engagable with the first planet gear, and is disposed on the ring gear shell. The second drive chain includes a second sun gear, a second planet gear, and a second ring gear. The second sun gear is disposed on the sun gear shaft. The second planet gear is engaged with the second sun gear, is rotatable about the sun gear shaft, and is operably connected to rotate a planet carrier about the sun gear shaft. The second ring gear is engagable with the second planet gear, and is disposed on the ring gear shell. The piston positions the ring gear shell to engage the first planet gear with the first ring gear when the first drive chain is in the first drive chain engaged state; and the piston positions the ring gear shell to engage the second planet gear with the second ring gear when the second drive chain is in the second drive chain engaged state.

The multi ratio drive 200 includes a sun gear shaft 210 with sun gears 212, 214; planet assembly 220 with planet carrier 222 and at least two planet gears 224, 226; ring gear shell 230 with at least two ring gears 232, 234; housing 240; piston 250; and bearing 260. The multi ratio drive 200 can also include a differential 270 and axles 272, 274. The housing 240 can contain lubricant (not shown) for the components of the multi ratio drive 200 within the housing 240, with seals (not shown) where any components pass through the housing 240.

The sun gear shaft 210 is operably connected to a transmission output gear (not shown), which turns the sun gear shaft 210. In this example, the sun gear shaft 210 is the drive shaft. The planet gears 224, 226 of the planet assembly 220 rotate on the sun gears 212, 214 of the sun gear shaft 210. The sun gears 212, 214 can be integral to or fixedly attached to the sun gear shaft 210. The planet gears 224, 226 run freely about the sun gears 212, 214 and project through the planet carrier 222. The sun gear 212, planet gear 224, and ring gear 232 form one drive chain 231, and the sun gear 214, planet gear 226, and ring gear 234 form another drive chain 233. The drive chains can have different gear ratios (from tooth spacing, diameter, and the like). Each of the drive chains has an engaged state and a disengaged state. In the engaged state, the planet gear and associated ring gear of the drive chain, such as planet gear 224 and ring gear 232 or planet gear 226 and ring gear 234, are aligned and mesh together. In the disengaged state, the planet gear and associated ring gear of the drive chain are not aligned and do not mesh, so the planet gear runs freely about the sun gear without engaging the associated ring gear.

Power is transferred from the sun gear shaft 210 to the planet carrier 222 when one of the drive chains is engaged. The planet gear meshes with the associated ring gear of the engaged drive chain, so the planet gear of the engaged drive chain walks around the ring gear of the ring gear shell 230, thus rotating the planet carrier 222. The ring gear shell 230 includes lugs (not shown) on the outside diameter, which ride in grooves (not shown) in the housing 240. The lugs are parallel to the longitudinal axis of the sun gear shaft 210, so the ring gear shell 230 can be moved along the longitudinal axis, aligning one or the other of the planet gears 224, 226 with the associated ring gear 232, 234 in the drive chain. The piston 250, which is circumferential to the inside of the housing 240 and adjacent to the ring gear shell 230, can move the ring gear shell 230 axially. The piston 250 can be moved by an actuator (not shown), such as a solenoid, actuator, vacuum motor, hydraulic motor, or the like, responsive to a piston control signal from the vehicle computer. The piston 250 can include a seal, such as an O-ring or the like, about the outer circumference to allow the piston 250 to slide against the housing 240.

In operation, the transmission output gear turns the sun gear shaft 210. In one configuration, the drive chain including the sun gear 214, planet gear 226, and ring gear 234 is engaged and the other drive chain including the sun gear 212, planet gear 224, and ring gear 232 is disengaged. The sun gear 214 drives the planet gear 226, which walks around the ring gear 234, so the planet gear 226 rotates the planet carrier 222. The planet gear 224 rotates around the sun gear 212 but does not transfer any power. The planet carrier 222, supported by the bearing 260, rotates the axles 272, 274 through the differential 54, which allows differential slip between the two axles 272, 274.

The gear ratio of the multi ratio drive 200 can be changed by disengaging the presently engaged drive chain and engaging the other drive chain. Power to the transmission output gear can be released to release the sun gear 214 in the presently engaged drive chain. The piston 250 can then move the ring gear shell 230 so the planet gear 224 is aligned with and meshes with the ring gear 232, so the drive chain including the sun gear 212, planet gear 224, and ring gear 232 is engaged. The drive chain including the sun gear 214, planet gear 226, and ring gear 234 is disengaged. The sun gear 212 drives the planet gear 224, which walks around the ring gear 232, so the planet gear 224 rotates the planet carrier 222. The planet gear 226 rotates around the sun gear 214 but does not transfer any power. The planet carrier 222, supported by the bearing 260, rotates the axles 272, 274 through the differential 270, which allows differential slip between the two axles 272, 274. Those skilled in the art will appreciate that a number of possible gear ratios can be provided, limited only by the space available in the housing 240 for the sets of drive chains. In one embodiment, the piston 250 is biased with springs to return to a predetermined position when the actuator is not applying pressure to the piston 250. In one example, the piston 250 can position the ring gear shell 230 to allow both of the drive chains 231, 233 to be disengaged when the actuator is not applying pressure to the piston 250. In another example, the piston 250 can position the ring gear shell 230 to allow one of the drive chains to be engaged and the other of the drive chains to be disengaged when the actuator is not applying pressure to the piston 250. Exemplary uses of the multi ratio drive are larger front wheel drive vehicles and the like.

Figure 7:
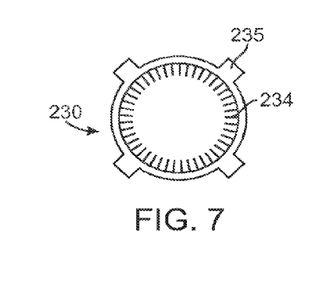
FIG. 7 is an end view of a ring gear shell for a multi ratio drive in accordance with the present invention.

FIG. 7, in which like elements share like reference numbers with FIG. 6, is an end view of a ring gear shell for a multi ratio drive in accordance with the present invention. The ring gear shell 230 includes the ring gear 234 about the inside diameter. Lugs 235 about the outer diameter are mateable with grooves in the housing to allow ring gear shell 230 to slide axially relative to the housing without rotating about the longitudinal axis of the sun gear shaft, and change the gear ratio of the multi ratio drive.

Figure 8:
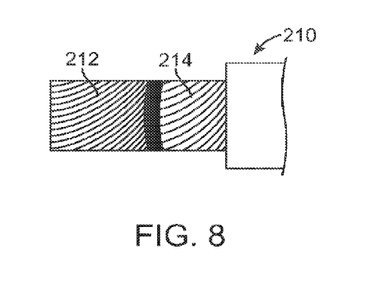
FIG. 8 is a side view of a sun gear shaft for a multi ratio drive in accordance with the present invention.

FIG. 8, in which like elements share like reference numbers with FIG. 6, is a side view of a sun gear shaft for a multi ratio drive in accordance with the present invention. The sun gear shaft 210 includes sun gears 212, 214. The sun gears 212, 214 can have different gearing characteristics, such as teeth per inch, angle, or the like, as desired for a particular application.

Figures 9, 10:
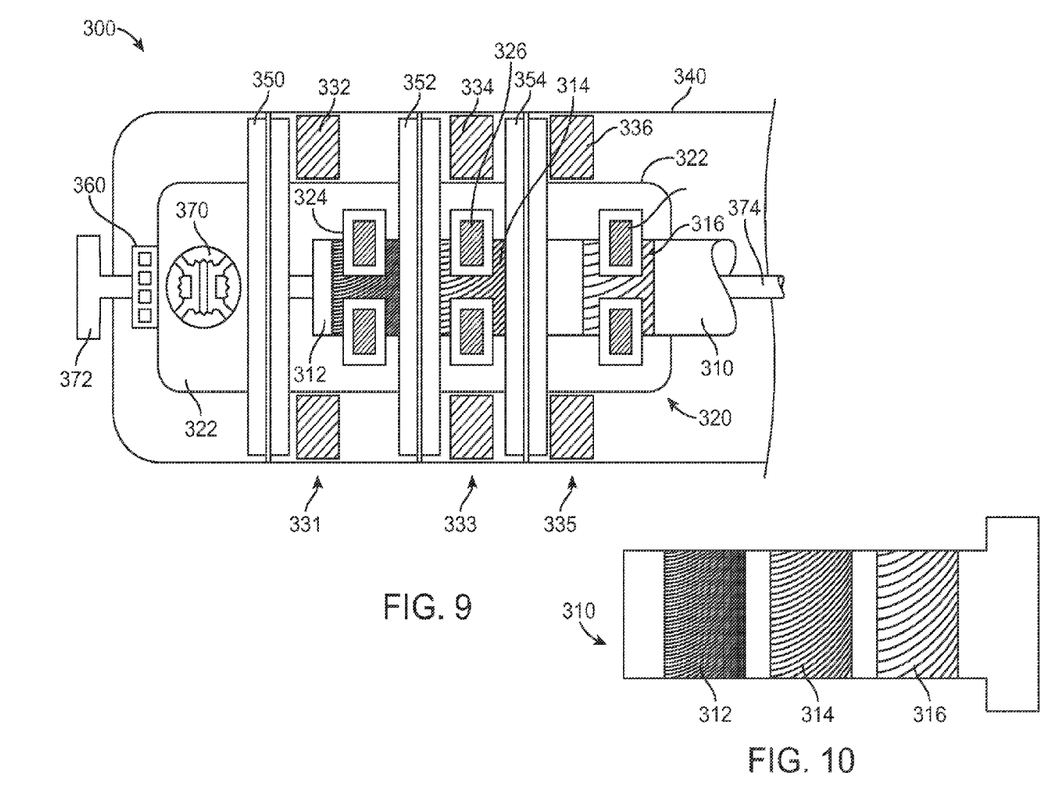
FIG. 9 is a schematic diagram of another embodiment of a multi ratio drive in accordance with the present invention.
FIG. 10 is a side view of a sun gear shaft for a multi ratio drive in accordance with the present invention.

FIG. 9 is a schematic diagram of another embodiment of a multi ratio drive in accordance with the present invention. In this embodiment, the multi ratio drive includes a housing; a first piston longitudinally slideable in the housing; and a second piston longitudinally slideable in the housing. The first drive chain includes a first sun gear, a first planet gear, and a first ring gear. The first sun gear is disposed on a sun gear shaft. The first planet gear is engaged with the first sun gear, is rotatable about the sun gear shaft, and is operably connected to rotate a planet carrier about the sun gear shaft. The first ring gear is engagable with the first planet gear, is longitudinally slideable and rotatably fixed in the housing, and is coupled to the first piston. The second drive chain comprises a second sun gear, a second planet gear, and a second ring gear. The second sun gear is disposed on a sun gear shaft. The second planet gear is engaged with the second sun gear, is rotatable about the sun gear shaft, and is operably connected to rotate a planet carrier about the sun gear shaft. The second ring gear is engagable with the second planet gear, is longitudinally slideable and rotatably fixed in the housing, and is coupled to the second piston. The first piston positions the first ring gear to engage the first planet gear when the first drive chain is in the first drive chain engaged state, and the second piston positions the second ring gear to engage the second planet gear when the second drive chain is in the second drive chain engaged state.

The multi ratio drive 300 includes a sun gear shaft 310 with sun gears 312, 314, 316; planet assembly 320 with planet carrier 322 and planet gears 324, 326, 328; ring gears 332, 334, 336; housing 340; pistons 350, 352, 354; and bearing 360. The multi ratio drive 300 can also include a differential 370 and axles 372, 374. The housing 340 can contain lubricant (not shown) for the components of the multi ratio drive 300 within the housing 340, with seals (not shown) where any components pass through the housing 340.

The sun gear shaft 310 is operably connected to a transmission output gear (not shown), which turns the sun gear shaft 310. The planet gears 324, 326, 328 of the planet assembly 320 rotate on the sun gears 312, 314, 316 of the sun gear shaft 310. The sun gears 312, 314, 316 can be integral to or fixedly attached to the sun gear shaft 310. The planet gears 324, 326, 328 run freely about the sun gears 312, 314, 316 and project through the planet carrier 322. The sun gear 312, planet gear 324, and ring gear 332 form one drive chain 331; the sun gear 314, planet gear 326, and ring gear 334 form another drive chain 333; and the sun gear 316, planet gear 328, and ring gear 336 form another drive chain 335. The drive chains can have different gear ratios (from tooth spacing, diameter, and the like). Each of the drive chains has an engaged state and a disengaged state. In the engaged state, the planet gear and associated ring gear of the drive chain (such as planet gear 324 and ring gear 332, or planet gear 326 and ring gear 334, or planet gear 328 and ring gear 336) are aligned and mesh together. In the disengaged state, the planet gear and associated ring gear of the drive chain are not aligned and do not mesh, so the planet gear runs freely about the sun gear without engaging the associated ring gear.

Power is transferred from the sun gear shaft 310 to the planet carrier 322 when one of the drive chains is engaged. The planet gear meshes with the associated ring gear of the engaged drive chain, so the planet gear of the engaged drive chain walks around the ring gear, thus rotating the planet carrier 322. The ring gears include lugs (not shown) on the outside diameter, which ride in grooves (not shown) in the housing 340. The lugs are parallel to the longitudinal axis of the sun gear shaft 310, so the ring gears can be moved along the longitudinal axis, aligning one or the other of the planet gears 324, 326, 328 with the associated ring gear 332, 334, 336 in the drive chain 331, 333, 335. The pistons 350, 352, 354, which are circumferential to the inside of the housing 340 and adjacent to each of the ring gears 332, 334, 336, can move the ring gears 332, 334, 336 axially. Each of the pistons 350, 352, 354 can be moved individually by an associated actuator (not shown), such as a solenoid, actuator, vacuum motor, hydraulic motor, or the like, responsive to a piston control signal from the vehicle computer. The pistons 350, 352, 354 can include a seal, such as an O-ring or the like, about the outer circumference to allow the pistons 350, 352, 354 to slide against the housing 340.

In operation, the transmission output gear turns the sun gear shaft 310. In one configuration, the drive chain 333 including the sun gear 314, planet gear 326, and ring gear 334 is engaged and the other drive chains 331, 335 are disengaged. The sun gear 314 drives the planet gear 326, which walks around the ring gear 334, so the planet gear 326 rotates the planet carrier 322. The planet gears 324, 328 rotate around the sun gears 312, 316 but do not transfer any power. The planet carrier 322, supported by the bearing 360, rotates the axles 372, 374 through the differential 370, which allows differential slip between the two axles 372, 374.

The gear ratio of the multi ratio drive 300 can be changed by disengaging the presently engaged drive chain and engaging another drive chain. Power to the transmission output gear can be released to release the sun gear 314 in the presently engaged drive chain 333. The piston 350 can then move the ring gear 332 so the planet gear 324 is aligned with and meshes with the ring gear 332, so the drive chain 331 including the sun gear 312, planet gear 324, and ring gear 332 is engaged. The piston 352 moves the ring gear 334 so the drive chain 333 including the sun gear 314, planet gear 326, and ring gear 334 is disengaged. The sun gear 312 drives the planet gear 324, which walks around the ring gear 332, so the planet gear 324 rotates the planet carrier 322. The planet gears 326, 328 rotate around the sun gears 314, 316 but do not transfer any power. The planet carrier 322, supported by the bearing 360, rotates the axles 372, 374 through the differential 370, which allows differential slip between the two axles 372, 374. Those skilled in the art will appreciate that a number of possible gear ratios can be provided, limited only by the space available in the housing 340 for the sets of drive chains. In one embodiment, the pistons 350, 352, 354 are biased with springs to return to a predetermined position when the actuator is not applying pressure to the pistons 350, 352, 354. In one example, the pistons 350, 352, 354 can position the ring gears 332, 334, 336 to allow the drive chains to be disengaged when the actuator is not applying pressure to the pistons 350, 352, 354. In another example, the pistons 350, 352, 354 can position the ring gears 332, 334, 336 to allow one of the drive chains 331, 333, 335 to be engaged and the other of the drive chains 331, 333, 335 to be disengaged when the actuator is not applying pressure to the pistons 350, 352, 354.

FIG. 10, in which like elements share like reference numbers with FIG. 9, is a side view of a sun gear shaft for a multi ratio drive in accordance with the present invention. The sun gear shaft 310 includes sun gears 312, 314, 316. The sun gears 312, 314, 316 can have different gearing characteristics, such as teeth per inch, angle, or the like, as desired for a particular application.

Figure 11:
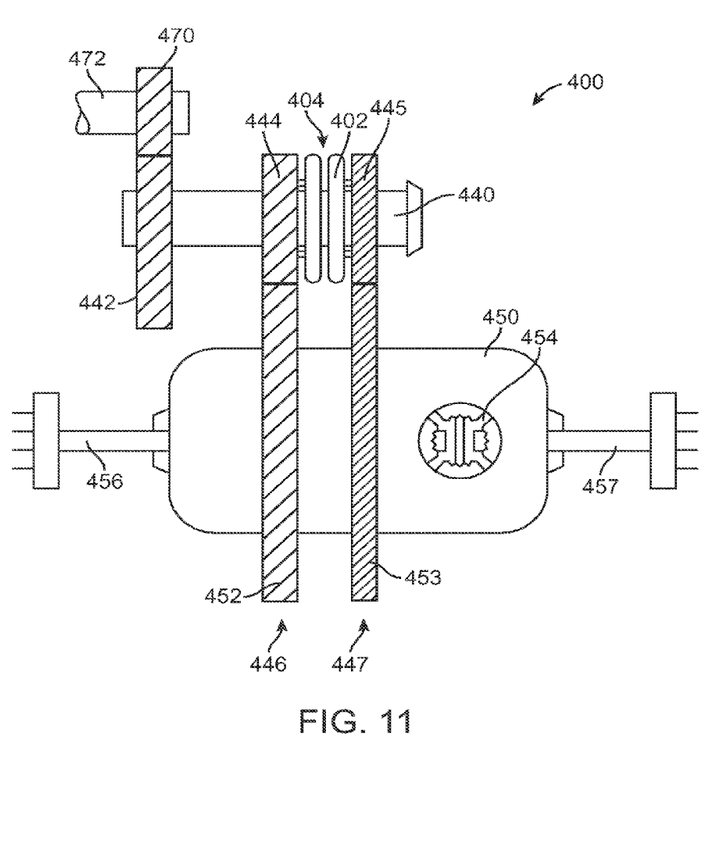
FIG. 11 is a schematic diagram of another embodiment of a multi ratio drive in accordance with the present invention.

FIG. 11 is a schematic diagram of another embodiment of a multi ratio drive in accordance with the present invention. In this embodiment, idler pinion gears are engaged and disengaged from an idler shaft using a synchronizer. The first drive chain includes a first idler pinion gear engaged with a first differential ring gear. The first idler pinion gear is locked on a drive shaft when the first drive chain is in the first drive chain engaged state and is rotatable on the drive shaft when the first drive chain is in the first drive chain disengaged state. The first differential ring gear is fixed on a differential assembly. The second drive chain includes a second idler pinion gear engaged with a second differential ring gear. The second idler pinion gear is locked on the drive shaft when the second drive chain is in the second drive chain engaged state and is rotatable on the drive shaft when the second drive chain is in the second drive chain disengaged state. The second differential ring gear is fixed on the differential assembly. The synchronizer is disposed on the drive shaft between the first idler pinion gear and the second idler pinion gear, and is slideable on the drive shaft to engage one of the first idler pinion gear and the second idler pinion gear. The synchronizer locks the first idler pinion gear to the drive shaft when the first drive chain is in the first drive chain engaged state, and locks the second idler pinion gear to the drive shaft when the second drive chain is in the second drive chain engaged state.

The multi ratio drive 400 includes an idler shaft 440 and a differential assembly 450, both of which are rotatably supported in a housing (not shown). A transmission output gear 470 receives rotational power from a transmission output shaft 472 and transfers the power to an idler gear 442 fixed to the idler shaft 440, rotating the idler shaft 440 about its longitudinal axis. The idler shaft 440 also has two or more idler pinion gears 444, 445, each of which has an engaged state and a disengaged state as determined by a synchronizer 402. In the engaged state, the idler pinion gear 444, 445 is locked to and rotates with the idler shaft 440. In the disengaged state, the idler pinion gear 444, 445 is free from and rotates about the idler shaft 440.

The idler pinion gears 444, 445 mesh with differential ring gears 452, 453, which are fixed to and rotate with the differential assembly 450. The differential ring gears 452, 453 and idler pinion gears 444, 445 form drive chains 446, 447. The drive chains 446, 447 can have different gear ratios (from tooth spacing, diameter, and the like) to allow the multi ratio drive 400 to operate at different gear ratios between the transmission output shaft 472 and axles 456, 457. In one embodiment, the differential assembly 450 includes a differential 454 operably connected to the axles 456, 457 to allow differential slip between the two axles 456, 457.

The idler pinion gears 444, 445 in this embodiment rotate freely about the idler shaft 440. The synchronizer 402 is adjacent to the main idler pinion gears 444, 445 and is operable to slide along the longitudinal axis of the idler shaft 440. The synchronizer 402 can be switched between neutral and locked states by sliding the synchronizer 402 along the idler shaft 440. In the neutral state, the synchronizer 402 is free to rotate about the idler shaft 440. In the locked state, the synchronizer 402 is locked to and rotates with the idler shaft 440. The synchronizer 402 engages one of the idler pinion gears 444, 445 in the locked state, so the engaged idler pinion gear is in an engaged state and rotates with both the synchronizer 402 and the idler shaft 440. The synchronizer 402 and the idler pinion gears 444, 445 have complementary mateable portions so that the synchronizer 402 and the engaged idler pinion gear turn together when the synchronizer 402 is pushed toward the idler pinion gear 444, 445. Thus, power passes from the idler shaft 440, through the synchronizer 402, the engaged idler pinion gear 444, 445, and one of the differential ring gears 452, 453 to the differential assembly 450.

The synchronizer 402 can have an inner hub (not shown) positively splined to and turned by the idler shaft 440 and an outer sleeve (not shown) that can slide along the inner hub relative to the longitudinal axis of the idler shaft 440. The outer sleeve slides longitudinally to engage the adjacent idler pinion gear 444, 445. When the synchronizer 402 is used with two idler pinion gears 444, 445, the synchronizer 402 is located between the two idler pinion gears 444, 445 with the neutral state centered between the two idler pinion gears 444, 445. The synchronizer 402 can be moved one direction along the idler shaft 440 to enter the locked state and engage one of the two idler pinion gears 444, 445 and the other direction along the idler shaft 440 to enter the locked state and engage the other of the two idler pinion gears 444, 445. When the synchronizer 402 is used with a single idler pinion gear, the synchronizer 402 is located adjacent the idler pinion gear with the neutral state away from the single idler pinion gear. The synchronizer 402 can be moved along the idler shaft 440 toward the single idler pinion gear to enter the locked state and engage the single idler pinion gear.

The synchronizer 402 can be moved longitudinally with a shift fork (not shown) riding in a groove 404 in the outer surface of the synchronizer 402. The shift fork can be moved relative to the housing by an actuator (not shown), such as a solenoid, actuator, vacuum motor, hydraulic motor, or the like. In one embodiment, the actuator is responsive to an actuator command signal from a vehicle computer. The shift fork can also be instrumented with position sensors providing shift fork position and movement indication to the vehicle computer. In another embodiment, the synchronizer 402 can be moved longitudinally with levers, cables, or the like, as used to change gears in vehicles with manual transmissions.

In operation, the transmission output shaft 472 rotates the transmission output gear 470, causing the idler shaft 440 to rotate through the transmission output gear 470. When the idler pinion gear 444 is in the engaged state, the engaged idler pinion gear 444 rotates with the idler shaft 440 and drives the differential ring gear 452 associated with the engaged idler pinion gear 444 in the drive chain 446. The differential ring gear 452 rotates the differential assembly 450, which rotates the axles 456, 457 through the differential 454. The idler pinion gear 445 in the disengaged state rotates about the idler shaft 440, driven by the differential ring gear 453 associated with the disengaged idler pinion gear 445 in the drive chain 447, but transfers minimal power. The gear ratio of the multi ratio drive 400 can be changed by disengaging the presently engaged idler pinion gear 444 and engaging the presently disengaged idler pinion gear 445 by moving the synchronizer 402. Those skilled in the art will appreciate that a number of possible gear ratios can be provided, limited only by the space available in the housing for the sets of drive chains. Exemplary uses of the multi ratio drive are smaller front wheel drive vehicles and the like.

Those skilled in the art will appreciate that in another embodiment the synchronizers and shift forks can be omitted and the idler pinion gears moved with a hydraulic clutch pack, such as a hydraulic clutch pack employing hydraulic cylinders as used in automatic transmissions. In one embodiment, the same pump that provides pressure to the automatic transmission can drive the hydraulic clutch pack, and the vehicle computer can also control the hydraulic clutch pack. The hydraulic clutch pack can be operable to engage one of the first idler pinion gear and the second idler pinion gear, locking the first idler pinion gear to the drive shaft when the first drive chain is in the first drive chain engaged state and locking the second idler pinion gear to the drive shaft when the second drive chain is in the second drive chain engaged state.

Figure 12:
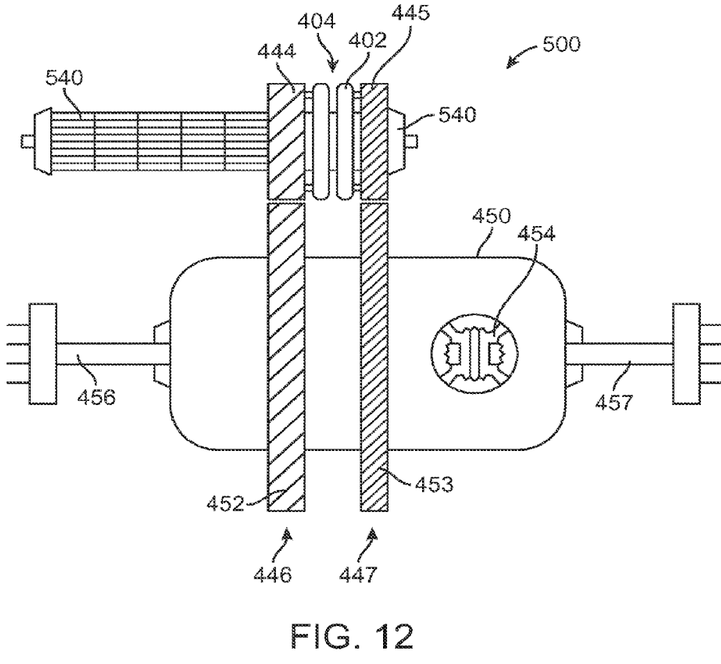
FIG. 12 is a schematic diagram of another embodiment of a multi ratio drive in accordance with the present invention.

FIG. 12, in which like elements share like reference numbers with FIG. 11, is a schematic diagram of another embodiment of a multi ratio drive in accordance with the present invention. In this embodiment of the multi ratio drive 500, the idler shaft is the transmission output shaft 540, on which the idler pinion gears 444, 445 and synchronizer 402 are disposed. One of the drive chains 446, 447 can be engaged by moving the synchronizer 402 longitudinally into a locked state which engages one of the idler pinion gears 444, 445. In another embodiment, the idler pinion gears can be moved with a hydraulic clutch pack rather than a synchronizer.

Figure 13:
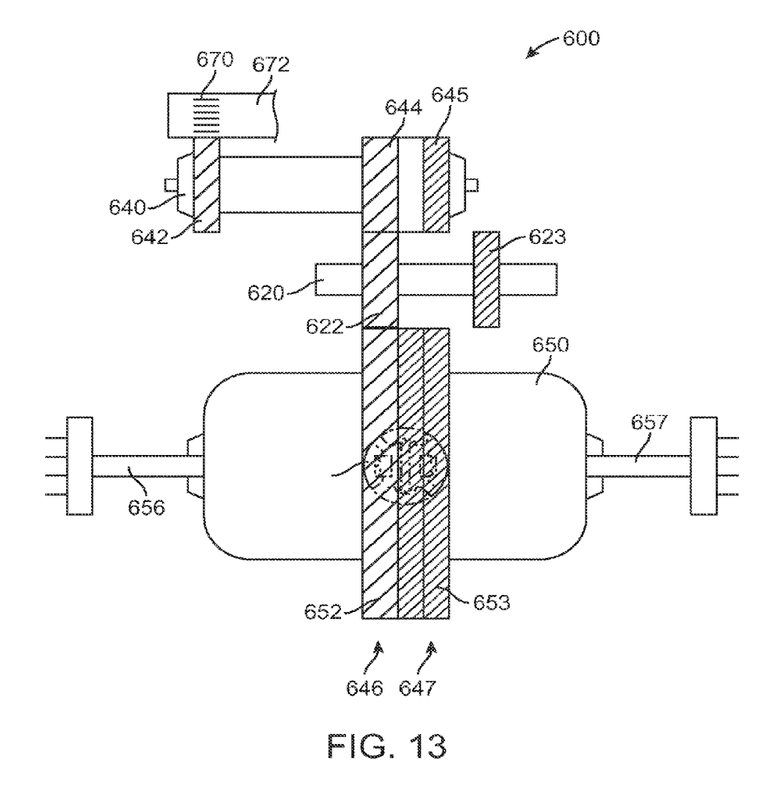
FIG. 13 is a schematic diagram of another embodiment of a multi ratio drive in accordance with the present invention.

FIG. 13 is a schematic diagram of another embodiment of a multi ratio drive in accordance with the present invention. In this embodiment, the first drive chain includes a first idler pinion gear, a first sliding pinion gear, and a first differential ring gear. The first idler pinion gear is fixed to an idler shaft. The first sliding pinion gear is engagable with the first idler pinion gear, and is fixed to a sliding shaft. The first differential ring gear is engagable with the first sliding pinion gear, and is fixed to a differential assembly. The second drive chain includes a second idler pinion gear, a second sliding pinion gear, and a second differential ring gear. The second idler pinion gear is fixed to the idler shaft. The second sliding pinion gear is engagable with the second idler pinion gear, and is fixed to the sliding shaft; and the second differential ring gear is engagable with the second sliding pinion gear, and is fixed to the differential assembly. The sliding shaft positions the first sliding pinion gear to engage the first idler pinion gear and the first differential ring gear when the first drive chain is in the first drive chain engaged state, and positions the second sliding pinion gear to engage the second idler pinion gear and the second differential ring gear when the second drive chain is in the second drive chain engaged state.

The multi ratio drive 600 includes an idler shaft 640, a sliding shaft 620, and a differential assembly 650, all of which are rotatably supported in a housing (not shown). A transmission output gear 670 receives rotational power from a transmission output shaft 672 and transfers the power to an fixed idler gear 642 fixed to the idler shaft 640, rotating the idler shaft 640 about its longitudinal axis. The idler shaft 640 also has two or more idler pinion gears 644, 645 fixed to the idler shaft 640.

The sliding shaft 620 has two or more sliding pinion gears 622, 623 fixed to the sliding shaft 620, which can be moved longitudinally along its axis relative to the idler shaft 640 and the differential assembly 650. The sliding shaft 620 can be moved relative to the housing by an actuator (not shown), such as a solenoid, actuator, vacuum motor, hydraulic motor, or the like. The idler pinion gears 644, 645 mesh with the sliding pinion gears 622, 623, which mesh with the differential ring gears 652, 653. The idler pinion gears 644, 645, sliding pinion gears 622, 623, and differential ring gears 652, 653 form drive chains 646, 647. The drive chains 646, 647 can have different gear ratios (from tooth spacing, diameter, and the like) to allow the multi ratio drive 600 to operate at different gear ratios between the transmission output shaft 672 and axles 656, 657. In one embodiment, the sliding shaft 620 can have a neutral state in which neither of the drive chains 646, 647 are engaged. In one embodiment, the differential assembly 650 includes a differential 654 operably connected to the axles 656, 657 to allow differential slip between the two axles 656, 657.

In operation, the transmission output shaft 672 rotates the transmission output gear 670, causing the fixed idler gear 642 to rotate the idler shaft 640. When the sliding pinion gear 622 is in the engaged state so that the drive chain 646 is engaged, the engaged sliding pinion gear 622 is rotated by the idler pinion gear 644 and drives the differential ring gear 652. The differential ring gear 652 rotates the differential assembly 650, which rotates the axles 656, 657 through the differential 654. The drive chain 647 is disengaged, so the idler pinion gear 645, sliding pinion gear 623, and differential ring gear 653 rotate with their respective shafts, but are not engaged to transfer power. The gear ratio of the multi ratio drive 600 can be changed by disengaging the presently engaged sliding pinion gear 622 to disengage the drive chain 646 and engaging the presently disengaged sliding pinion gear 623 to engage the drive chain 647 by moving the sliding shaft 620. Those skilled in the art will appreciate that a number of possible gear ratios can be provided, limited only by the space available in the housing for the sets of drive chains.

While the embodiments of the invention disclosed herein are presently considered to be preferred, various changes and modifications can be made without departing from the scope of the invention. Those skilled in the art will appreciate that the multi ratio drives illustrated in FIGS. 1-5 can be used with rear wheel drive vehicles or any other application in which the drive shaft is at a right angle to the axle. Those skilled in the art will further appreciate that the multi ratio drives illustrated in FIGS. 6-13 can be used with front wheel drive vehicles having a transaxle or any other application in which the drive shaft is parallel to the axle. The multi ratio drive can be so dimensioned to fit within the housing of existing single ratio drives, so the multi ratio drive can be retrofit into existing vehicles. The scope of the invention is indicated in the appended claims, and all changes that come within the meaning and range of equivalents are intended to be embraced therein.

The invention claimed is:

1. A multi ratio drive operably connecting a drive shaft and an axle, the multi ratio drive comprising:
a housing;
a piston longitudinally slideable in the housing; and
a ring gear shell longitudinally slideable and rotatably fixed in the housing, the ring gear shell being coupled to the piston;
a first drive chain having a first drive chain engaged state and a first drive chain disengaged state; the first drive chain comprising a first sun gear, a first planet gear, and a first ring gear; the first sun gear being disposed on a sun gear shaft; the first planet gear being engaged with the first sun gear, being rotatable about the sun gear shaft, and being operably connected to rotate a planet carrier about the sun gear shaft; and the first ring gear being engagable with the first planet gear, and being disposed on the ring gear shell; and
a second drive chain having a second drive chain engaged state and a second drive chain disengaged state; the second drive chain comprising a second sun gear, a second planet gear, and a second ring gear; the second sun gear being disposed on the sun gear shaft; the second planet gear being engaged with the second sun gear, being rotatable about the sun gear shaft, and being operably connected to rotate a planet carrier about the sun gear shaft; and the second ring gear being engagable with the second planet gear, and being disposed on the ring gear shell;
wherein the first drive chain drives the axle with a first gear ratio between the drive shaft and the axle when the first drive chain is in the first drive chain engaged state and the second drive chain is in the second drive chain disengaged state; and
the second drive chain drives the axle with a second gear ratio between the drive shaft and the axle when the second drive chain is in the second drive chain engaged state and the first drive chain is in the first drive chain disengaged state;
the first gear ratio is different from the second gear ratio;
the piston positions the ring gear shell to engage the first planet gear with the first ring gear when the first drive chain is in the first drive chain engaged state; and
the piston positions the ring gear shell to engage the second planet gear with the second ring gear when the second drive chain is in the second drive chain engaged state.

2. The multi ratio drive of claim 1 further comprising an actuator operably connected to apply pressure to the piston when the actuator receives a piston control signal.

3. The multi ratio drive of claim 2 wherein the piston is biased to a predetermined position when the actuator is not applying pressure to the piston.

4. The multi ratio drive of claim 3 wherein the predetermined position disengages the first drive chain and disengages the second drive chain.

5. The multi ratio drive of claim 3 wherein the predetermined position engages the first drive chain and disengages the second drive chain.

6. The multi ratio drive of claim 2 wherein the actuator is selected from the group consisting of a solenoid, a vacuum motor, and a hydraulic motor.

7. The multi ratio drive of claim 1 further comprising a slideable seal disposed between the piston and the housing.

8. The multi ratio drive of claim 1 wherein the axle is a straight axle.

9. The multi ratio drive of claim 1 wherein the axle comprises a first axle and a second axle operably connected to the first drive chain and the second drive chain through a differential.

10. The multi ratio drive of claim 1 further comprising a power take-off (PTO) having a PTO coupling gear engaged with the second drive chain.

11. A multi ratio drive comprising:
a housing;
a piston longitudinally slideable in the housing;
a ring gear shell longitudinally slideable and rotatably fixed in the housing, the ring gear shell being coupled to the piston and having a first ring gear and a second ring gear;
a sun gear shaft having a first sun gear and a second sun gear;
a planet gear assembly having a first planet gear operably connected to a planet carrier and a second planet gear operably connected to the planet carrier;
a differential operably connected to the planet carrier;
a first axle operably connected to the differential; and
a second axle operably connected to the differential;
wherein:
a first drive chain comprises the first sun gear, the first planet gear, and the first ring gear, the first planet gear being engaged with the first sun gear and the first ring gear being engagable with the first planet gear;
a second drive chain comprises the second sun gear, the second planet gear, and the second ring gear, the second planet gear being engaged with the second sun gear and the second ring gear being engagable with the second planet gear;
the first drive chain connects the sun gear shaft to the first axle and the second axle at a first gear ratio when the piston positions the ring gear shell with the first ring gear being engaged with the first planet gear; and
the second drive chain connects the sun gear shaft to the to the first axle and the second axle at a second gear ratio when the piston positions the ring gear shell with the second ring gear being engaged with the second planet gear.

12. The multi ratio drive of claim 11 wherein the ring gear shell has a third ring gear, the sun gear shaft has a third sun gear, the planet gear assembly having a third planet gear operably connected to the planet carrier, wherein:
a third drive chain comprises the third sun gear, the third planet gear, and the third ring gear, the third planet gear being engaged with the third sun gear and the third ring gear being engagable with the third planet gear; and
the third drive chain connects the sun gear shaft to the to the first axle and the second axle at a third gear ratio when the piston positions the ring gear shell with the third ring gear being engaged with the third planet gear.

* * * * *